Patented June 27, 1939

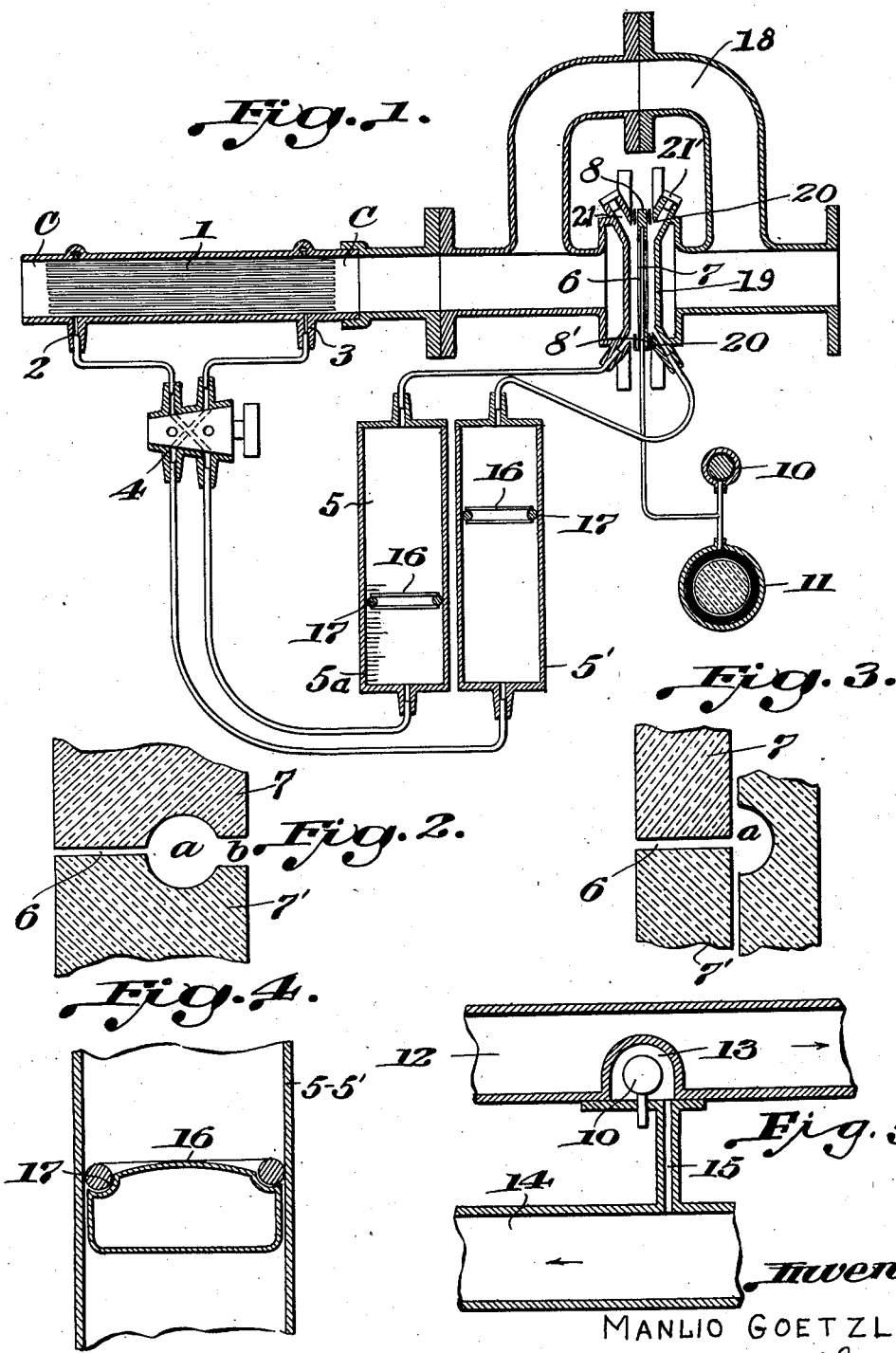

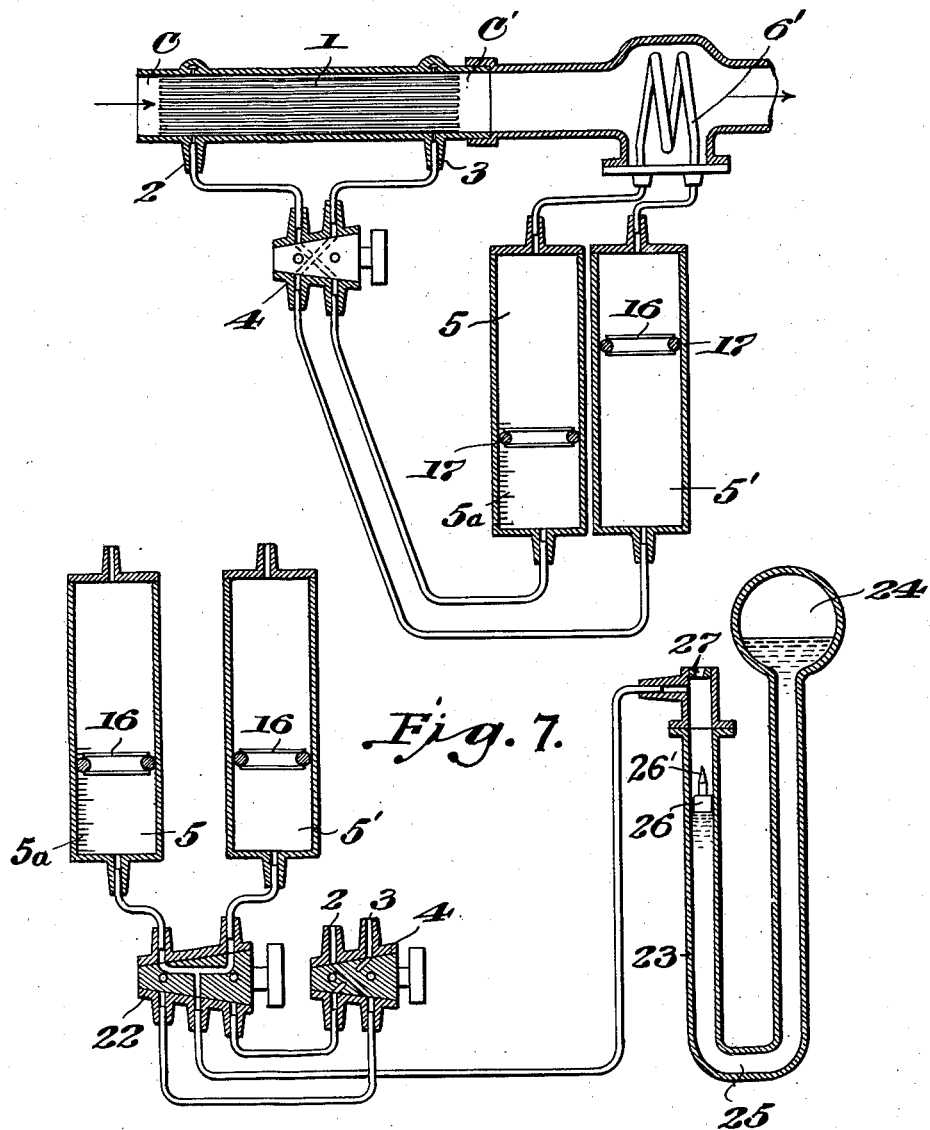

2,163,730

UNITED STATES PATENT OFFICE

2,163,730

INTEGRATING CALORIMETER

Manlio Goetzl, Trieste, Italy

Application March 18, 1936, Serial No. 69,573
In Italy March 29, 1935

17 Claims. (Cl. 73—193)

This invention relates to an apparatus for determining the quantities of heat, either positive or negative, consumed or produced in an industrial or domestic thermal plant, wherein is circulating a fluid substance of any nature, for instance air or water, which constitutes the carrier of heat.

The quantity of heat consumed or produced in each definite interval of time is given by the product of the quantity of fluid passed during said interval by its content of heat, that is, practically, by its specific heat and its temperature with the addition of a constant; in the case of a closed circuit (as for instance in the heating plants with circulating water) the quantity of fluid is to be multiplied by its specific heat and the difference between the influx and return temperatures.

In the apparatus according to the invention said product and its integration are executed automatically so as to allow the reading, for instance on a suitable integrating scale, of the quantity of heat corresponding to a determinate period of time, even if long.

According to the invention a by-pass through a gauge orifice is established between two points of a conduit, between which there is a difference of pressure corresponding to the velocity of flow in the conduit, said gauge orifice being preferably adjustable in correspondence to the temperature of the circulating fluid or to the difference between the temperature of said fluid in the inflow and return ducts, and means are provided for measuring the small quantity of fluid passed through said orifice during each determinate interval of time.

The embodiments of the invention are numerous, according to the circumstances and to the means employed for providing the by-pass between the points at different pressure, for regulating the cross section of the gauge orifice or for measuring the flow therethrough. As a mere illustration, but not as a limitation, several embodiments will be now described, wherein in the conduit there is inserted a nest of concentric tubes with sufficiently narrow annular interspaces, to ensure a flow free from whirls and that the fall of pressure will be in direct proportion to the velocity of the fluid, according to the law of steady parallel flow.

Fig. 1 represents diagrammatically a section through an embodiment of the apparatus;

Fig. 2 is a horizontal cross section, on a larger scale, through a part of the apparatus, which constitutes the gauge slot;

Fig. 3 is a similar cross section, also on a larger scale, of another variation of that part of the apparatus which constitutes the gauge orifice;

Fig. 4 is a section through a variation of the indicating piston;

Fig. 5 is a section through a part of the apparatus containing an inflow thermometer;

Fig. 6 is a section through another embodiment of the apparatus;

Fig. 7 is a section through a variation of a part of the apparatus, intended for gaseous fluids.

As shown in Fig. 1, in a circulation conduit is inserted a n st of tubes 1 with sufficiently narrow annular interspaces, therethrough to ensure a flow free from whirls therethrough and to establish a substantial fall of pressure between two connections 2 and 3. Said fall will be directly proportional to the velocity and consequently to the quantity of flow, according to Poiseuille's law.

Between the two connections 2 and 3 is inserted a complex by-pass 2, 4, 5, 6, 5', 4, 3 comprising also a gauge slot 6 which allows the passage of an extremely small quantity of fluid, also in a flow free from whirls, so that said quantity is proportional to the fall of pressure between the connections 2 and 3 and consequently to the quantity of flow through the main duct, provided that the coefficient of viscosity of the fluid in the nest of concentric tubes and through the gauge orifice be practically the same at each moment, which can be obtained, for instance, by the expedient hereinafter specified.

If the gauge slot has a constant section, the apparatus will serve only for the measure of the quantity of fluid passing through the main duct and may be considered, therefore, as a calorimeter for a sufficiently constant fluid temperature, though it acts only as a simple flow meter. If, however, the temperatures are varying, the section of the gauge slot has to be regulated so that the quantity of the gauge flow should be proportional at each instant to the product of the quantity of flow in the main duct by the difference between the inflow and return temperatures; the measure of the quantity of fluid passed through the gauge slot during a determinate time will give, therefore, the sum of the instantaneous values of that product.

In the apparatus as represented, the gauge slot has a linear section and is very narrow, being formed by two small plates, for instance of glass or quartz, 7 and 7' separated from each other at a very small distance, for example 0.008 mm. Two pieces, for instance of platinum, 8 and 8' keep at their proper distance said two small plates, which may be, for instance, 50 mm. long. The holding of said plates may be ensured by means of an external frame, not shown in the drawing. The slot 6 may be, for instance, 5 mm. deep, that is measured transversely to the plate. Adjacent to one end of the slot (in Fig. 2, at the right side) there are provided two semicircular grooves, forming a capillary channel $a$ having for instance, a diameter of 0.5 mm. and being open along two opposite generatrices, the second linear aperture of said channel (in the drawings the one at the right side) being much wider than the proper gauge slot 6, so that the fall of pressure therethrough is very low. A vein of mercury is provided in the capillary channel $a$ and serves to regulate the longitudinal section of the slot. Said channel is continued upwardly to the upper ends of the plates. An enlarged cross section of the slot and channel formed by the small plates 7, 7' is represented in Fig. 2. The narrow part at the left represents the gauge slot 6 which in the present example is 5 mm. deep. The widened round portion forms the capillary channel containing the mercury while the wider aperture at the right forms a slot $b$ wherein the fall of pressure is kept as low as possible.

Water can pass through an opening of 0.5 mm., but not mercury owing to capillarity.

Fig. 3 shows a variation of the slot, wherein the capillary channel consists of a groove in a third adjacent plate.

The necessary movements of the capillary vein of mercury are obtained here by means of a differential thermometric device, by connecting said vein with the mercury contained in two thermometers, an ordinary one 10 which measures the temperature of the return duct, and a special one 11 actuated by the temperature in the inflow duct. In this second thermometer the mercury fills the narrow interspace between an external glass or iron shell and an internal quartz core; as glass or iron has a higher coefficient of expansion due to heat than quartz, the volume of the interspace increases with the temperature and the mercury falls in the thermometer 11. As a consequence, the capillary vein of mercury partially obstructing the gauge orifice falls or rises in inverse proportion to the rise or fall in the difference between the temperatures acting on the two thermometers 10 and 11.

Of course the length and, if desired, the depth of the gauge slot may be regulated by any other way or else the mercury vein may be actuated by any other differential thermometric device.

Fig. 5 represents a possible disposition of the inflow thermometer. In this disposition said thermometer does not extend directly in the inflow duct 12, but into a socket 13 wherein the temperature is that of the inflow duct but the pressure is that of the return duct, a connection with the latter being provided by a tube 15. In this way error due to elastic deformations of the thermometer caused by differences between the external and internal pressures is eliminated (the mercury vein in this embodiment is under the influence of the pressure in the return duct.)

An integrating means is also connected in the by-pass comprising two cylindrical containers 5 and 5', each divided by a sliding piston 16, and connected to opposite sides respectively of the gauge slot. Said pistons, which ought to have the same weight so as not to cause extra pressures, are provided with at least one groove 17 filled with mercury, which ensures tightness between the upper and lower portions of the container. The fluid flows slowly through the slot passing from one cylindrical container to the other and causing the sliding piston to rise and fall.

The cylindrical container 5 is provided with scale indicia 5a. The two cylindrical containers 5 and 5' do not communicate with the connections 2 and 3 directly, but only through the reversing valve 4. This valve is so constructed that for a determinate position of the plug the container 5 communicates with the connection 2 and the container 5' with the connection 3, whilst for another position of the plug the container 5 communicates with the connection 3 and the container 5' with the connection 2. After each reading, the valve is reversed and the direction of the measuring fluid is changed. Thus between two determinate readings, the piston will rise in the container 5 and fall in the container 5' and between the two successive readings the movement of the piston will be reversed. It will be enough that one of the containers be provided with a scale, whereon to measure the heat consumption from the length of path of the diaphragm between two readings, as the length of path upwards or downwards of the piston multiplied by the constant of the apparatus indicated the sum of the gauge quantities of flow, which are proportional to the product of the quantity of flow in the main duct by the instantaneous difference between the temperatures in the inflow and return duct.

The fluid employed for the determination and passing through the gauge slot remains separated from the circulating fluid, a higher purity of the former being thus ensured. A fluid of a different nature from that in the main duct may be employed for the determination in the by-pass duct, moreover, as only a quantity of fluid has to be measured, any other suitable flow meter might be used instead of the one described.

Fig. 4 represents a variation of the piston indicated, wherein said piston has the same specific gravity as the fluid (water), so as not to generate extra pressures as in the case of a single cylindrical container, as it is of hollow construction and the mercury ring 17 is simply supported by the same.

In the embodiment represented in Fig. 1, the two small plates 7 and 7' forming the gauge slot are inserted in the main duct which is thus interrupted, the fluid in said duct being wholly deviated through a U bend 18 and excluded from the gauge chamber by the walls 19. The flow of measuring fluid inside this chamber and through the gauge slot is maintained between metallic walls 19 at a temperature which is always equal to that of the flow in the main conduit, an equal viscosity and an equal density is ensured in the gauge orifice and in the nest of tubes and, therefore, proportionality is maintained between the two velocities and quantities of flow.

Of course, any other disposition of the gauge orifice or any other expedient may be adopted, by which to maintain the ratio between the coefficient of viscosity (and, if necessary of density) in the main duct and in the gauge orifice equal to 1 or to any constant value.

The plates comprising the gauge orifice are fixed within the main duct by means of set screws and with the interposition of elastic gaskets 20.

In the above conditions, for the slot length of about 50 mm., open for an average portion of two thirds, with an average fall of pressure corresponding to a head of water of 20 mm. and a viscosity corresponding to 70° C. in the return conduit, the total gauge quantity of flow in the 720 hours of a month will be 360 cu. cm., so that the space occupied by apparatus as described is very limited.

The previous filling with clean water of the by-pass duct above the sliding pistons may be made through the holes 21 fitted with screw plugs 21'.

Fig. 6 represents diagrammatically the cross section of another embodiment of the invention wherein the quantity of heat through a duct is to be measured when the temperature therein is kept sufficiently constant. The apparatus in this case will act both as a calorimeter and as a simple flow-meter and it might serve also only for the latter purpose.

In the duct is inserted, as in the variation of Fig. 1, a nest of concentric tubes with the two pressure tappings, between which is inserted a by-pass leading through two containers 5, 5' and a reversing valve 4, to a gauge orifice 6 which in this case cannot be regulated. Said gauge orifice consists of a capillary tube 6 completely merged in the fluid of the main conduit, with the object of maintaining therein constantly the same temperature and consequently the same viscosity and density as in the main conduit whereby the quantity of the gauge flow is proportional by weight to that in the main duct.

For taking into account, during the reading, variations of density caused by the fluctuations of temperature and pressure in the container 5, the latter may be provided with a thermometer and, in the case of gaseous fluid, also with a pressure gauge, so that the readings may be multiplied by the corresponding coefficient of correction.

In Fig. 7 is represented a disposition of the containers 5 and 5' for the case of a gaseous fluid, wherein the temperature and pressure correction can be made automatically during each reading. The two containers 5 and 5' are connected with each other and with a tube 23 by means of a valve 22. The tube 23 contains a determinate quantity of gas at one end 24 some mercury in the middle 25, and a plug 26 with a point 26' floating on said mercury. Point 26' can close the small hole 27. When the valve is in the position shown in the drawing, which is the reading position, some gas flows out from the containers 5 and 5' through the hole 27 until the pressure in the containers has lowered to that of the gas in 24 and the mercury column has forced the plug to close the hole 27 which communicates with the atmosphere. At the same time the transparent containers 5 and 5' are disconnected from the taps 2 and 3. The pistons 16 will move and the gas collected in the container 5 will have, at the moment of the reading, always the same pressure with temperature correction; it will give an exact measure of the heat or of the quantity of flow in the main duct.

After the reading the valve is reversed so that the containers 5 and 5' will communicate again with the taps 2 and 3 through the valve 4.

Besides the secondary dispositions and variations described above, others may be adopted as additions or alternatives.

What I claim is:

1. A calorimeter for measuring the heat consumed or produced in a heating system having a flow of heat-carrying medium through a conduit, comprising means in the conduit for producing by internal friction a determined fall of pressure between opposite ends of said means directly proportional to the velocity of flow of said medium in the conduit, a by-pass around said means and in parallel therewith, a gauge in said by-pass having an orifice of such dimensions that the velocity of the medium through the by-pass, which is controlled by the difference in pressure produced by said means in the conduit is also proportional to this difference of pressure and that the quantity of said medium through the by-pass is directly proportional to the quantity of flow of said medium in the main conduit, and means for measuring the quantity of flow of said medium through said by-pass.

2. A calorimeter for measuring the heat consumed or produced in a heating system having a flow of heat-carrying medium through a conduit, comprising means in the conduit for producing by internal friction a determined fall of pressure between opposite ends of said means directly proportional to the velocity of flow of said medium in the conduit, a by-pass around said means and in parallel therewith, a gauge in said by-pass having an orifice of such dimensions that the velocity of the medium through the by-pass, which is controlled by the difference in pressure produced by said means in the conduit is also proportional to this difference of pressure and that the quantity of said medium through the by-pass is directly proportional to the quantity of flow of said medium in the main conduit, means for measuring the quantity of flow of said medium through said by-pass, and means to obtain that the ratio between the coefficient of viscosity of said medium in said means in the main conduit for producing the determined fall of pressure and the coefficient of viscosity in the gauge orifice is at each moment nearly equal to 1, and to maintain the temperature of the main conduit and of the gauge orifice in mutual influence.

3. A calorimeter according to claim 1 for use as a simple flow meter in which the gauge orifice of the by-pass is of stream-line flow and is immersed in the medium of the main duct, so that the temperature and the coefficient of viscosity in the gauge orifice of the by-pass and in the main duct are maintained nearly equal.

4. A calorimeter for measuring the heat consumed or produced in a heating system having a flow of heat-carrying medium through a conduit, comprising means in the conduit for producing by internal friction a determined fall of pressure between opposite ends of said means directly proportional to the velocity of flow of said medium in the conduit, a by-pass, a gauge in said by-pass having an orifice of such dimensions that the fall of pressure produced by internal friction is also proportional to the velocity of said medium in the orifice and the quantity of said medium through the by-pass is directly proportional to the quantity of flow of said medium in the main conduit, means for measuring the quantity of flow of said medium through said by-pass, and means for regulating the dimensions of the gauge orifice in proportion to the fall of temperature in the heating medium between the inflow and return conduits of the system.

5. A calorimeter for measuring the heat consumed or produced in a heating system having a flow of heat-carrying medium through a conduit, comprising means in the conduit for producing by internal friction a determined fall of pressure between opposite ends of said means directly proportional to the velocity of flow of said medium in the conduit, a by-pass, a gauge in said by-pass having an orifice of such dimensions that the fall of pressure produced by internal friction is also proportional to the velocity of said medium in the orifice and the quantity of said medium through the by-pass is directly proportional to the quantity of flow of said medium in the main conduit, means for measuring the quantity of flow of said medium through said by pass, said means integrating the measured flow in the by-pass, and means for regulating the dimensions of the gauge orifice in proportion to the fall of temperature in the heating medium between the inflow and return conduits of the system.

6. A calorimeter according to claim 4, in which the gauge orifice is formed by a narrow slot between adjacent plates and the length of the slot is variable by means of a capillary vein of mercury in said slot controlled by thermometric apparatus adapted to cause said vein to lengthen or shorten in proportion to fluctuations in said fall of temperature.

7. A calorimeter for measuring the heat consumed or produced in a heating system having a flow of heat-carrying medium through a conduit, comprising means in the conduit for producing by internal friction a determined fall of pressure between opposite ends of said means directly proportional to the velocity of flow of said medium in the conduit, a by-pass, a gauge device in said by-pass having an orifice formed by a narrow slot between adjacent walls of the gauge device, a capillary vein of mercury in said slot for regulating its length, a thermometric device responsive to the fall of temperature of the medium in the heating system, said device causing said vein to lengthen or shorten, and means for measuring the quantity of flow of said medium through the gauge device.

8. A calorimeter according to claim 7, in which the thermometric device includes a hollow shell having a high coefficient of expansion due to heat, a core of a substance having a low heat expansion coefficient enclosed in said shell, and a quantity of mercury occupying the space between said shell and core and actuating the capillary vein.

9. Apparatus according to claim 7, in which the thermometric device is responsive to the temperature of the inflow, and a second thermometric device is provided responsive to the temperature of the return medium, the mercury in both thermometric devices being in communication with the capillary vein to affect the same differentially.

10. A calorimeter according to claim 7, in which the thermometric device includes a hollow shell having a high coefficient of expansion due to heat, a core of a substance having a low heat expansion coefficient enclosed in said shell, and a quantity of mercury occupying the space between said shell and core and actuating the capillary vein, and in which a second thermometric device is provided, in combination with means in the inflow conduit of the heating system for exposing the shell of the first thermometric device to the temperature of the inflow medium and to the pressure of the return medium.

11. A calorimeter according to claim 7, in which the thermometric device includes a hollow shell having a high coefficient of expansion due to heat, a core of a substance having a low heat expansion coefficient enclosed in said shell, and a quantity of mercury occupying the space between said shell and core and actuating the capillary vein, and in which a second thermometric device is provided, in combination with means for exposing the second thermometric device to the temperature of the return medium and to the pressure of the inflow medium.

12. A calorimeter according to claim 5, in which the integrating means comprises a cylinder communicating at one end with the gauge orifice and at the other end with one end of the means for producing a determined pressure fall, a fluid-tight piston in said cylinder, a scale for indicating the travel of the piston from one end of the cylinder, and a discharge valve for bringing the piston back to said end and the scale zero.

13. A calorimeter according to claim 5, wherein the integrating means comprises a pair of cylinders each having a fluid-tight piston therein, a scale for indicating the piston travel from one end of one cylinder, said two cylinders at their one end being connected to opposite sides respectively of the gauge orifice and their other end to opposite ends respectively of the pressure fall producing means.

14. A calorimeter according to claim 5, wherein the integrating means comprises a pair of cylinders each having a fluid-tight piston therein, a scale for indicating the piston travel from one end of one cylinder, said two cylinders at their one end being connected to opposite sides respectively of the gauge orifice and their other end to opposite ends respectively of the pressure fall producing means, and comprising also a valve in the by-pass for reversing the direction of flow of said medium through said gauge orifice and integrating means.

15. A calorimeter according to claim 5, in which the integrating means comprises a cylinder communicating at one end with the gauge orifice and at the other end with one end of the means for producing a determined pressure fall and in which said cylinder comprises a thermometric device for taking into account the variations of density of the fluid collected in the container depending from the temperature, and thus stating the weight of the quantity of fluid passed through the gauge orifice as a measure of the quantity of heat in the main duct, a fluid-tight piston in said cylinder, a scale for indicating the travel of the piston from one end of the cylinder, and a discharge valve for bringing the piston back to said end and the scale zero.

16. A calorimeter according to claim 5 for use in systems employing a gaseous heating medium in which the integrating means comprises a cylinder communicating at one end with the gauge orifice and at the other end with one end of the means for producing a determined pressure fall and in which said cylinder comprises a thermometric device and a pressure gauge for taking into account the variations of density of the fluid collected in the container depending from the temperature and from the pressure, and thus stating the weight of the quantity of fluid passed through the gauge orifice as a measure of the quantity of heat and of flow in the main duct, a fluid-tight piston in said cylinder, a scale for indicating the travel of the piston from one end of the cylinder, and a discharge valve for bringing the piston back to said end and the scale zero.

17. A calorimeter according to claim 5 for use in systems employing a gaseous heating medium, wherein the integrating means comprises a pair of cylinders each having a fluid-tight piston therein, a scale for indicating the piston travel from one end of the cylinder, said two cylinders at their one end being connected to opposite sides respectively of the gauge orifice and their other end to opposite ends respectively of the pressure fall producing means, and comprising also a valve in the by-pass for reversing the direction of flow through said gauge orifice and integrating means, said valve comprising means for disconnecting the cylinders from the pressure fall producing means and for connecting said cylinders to a further apparatus comprising a U-tube containing a mercury column and having at one end a bulb with a determined quantity of gas entrapped therein by the mercury column, the cylinders being connected to the other end of the U-tube, which end is provided with a vent closed by a rise of mercury in said end after the cylinders and the U-tube are connected.

MANLIO GOETZL.